United States Patent [19]

Ou et al.

[11] 4,434,905
[45] Mar. 6, 1984

[54] RUPTURABLE LOW PRESSURE RELIEF APPARATUS

[75] Inventors: Sam A. Ou, Bixby; Charles E. Beair, Tulsa, both of Okla.

[73] Assignee: BS&B Safety Systems, Inc., Tulsa, Okla.

[21] Appl. No.: 363,820

[22] Filed: Mar. 31, 1982

[51] Int. Cl.³ ............................................... B65B 25/00
[52] U.S. Cl. ............................. 220/89 A; 137/68 R; 137/69
[58] Field of Search .............. 137/68 R, 69; 220/89 A

[56] References Cited

U.S. PATENT DOCUMENTS

| | | | |
|---|---|---|---|
| 2,954,893 | 10/1960 | Hansen | 220/89 A |
| 3,698,598 | 10/1972 | Wood | 220/89 A |
| 3,881,629 | 5/1975 | Shaw | 137/68 R X |
| 4,119,236 | 10/1978 | Shaw | 220/89 A |
| 4,278,181 | 7/1981 | Wood | 220/89 A |

*Primary Examiner*—Harold W. Weakley
*Attorney, Agent, or Firm*—C. Clark Dougherty, Jr.

[57] ABSTRACT

Rupturable pressure relief apparatus are provided which are less subject to damage and premature failure as a result thereof and which reliably rupture at very low pressure differentials. The apparatus are adapted to be clamped between conventional pipe flanges or annular support members and are basically comprised of a first circular rupturable member formed of solid flexible material and a second circular rupturable member also formed of flexible material positioned adjacent the first rupturable member. The second rupturable member includes a solid annular flange portion and a plurality of arcuate slots circumscribing a substantially circular central portion wth rupture tabs between the arcuate slots. Knife means having a cutting edge forming at least a portion of a circle are positioned adjacent the second rupturable member on the side thereof opposite from the first rupturable member so that when the second rupturable member ruptures, the first rupturable member is severed by the knife means. Alternate embodiments add addtional rupturable members and knife means to cause the apparatus to rupture in either directon at low pressure differentials.

19 Claims, 13 Drawing Figures

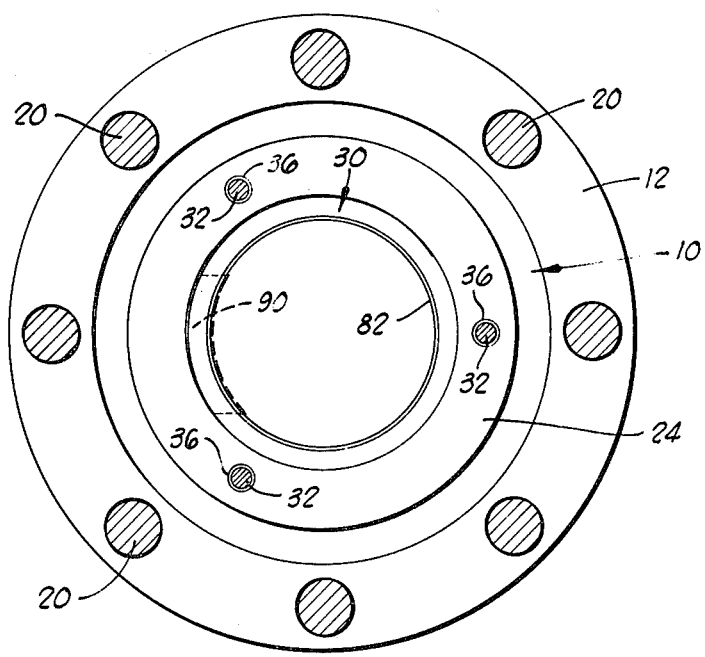
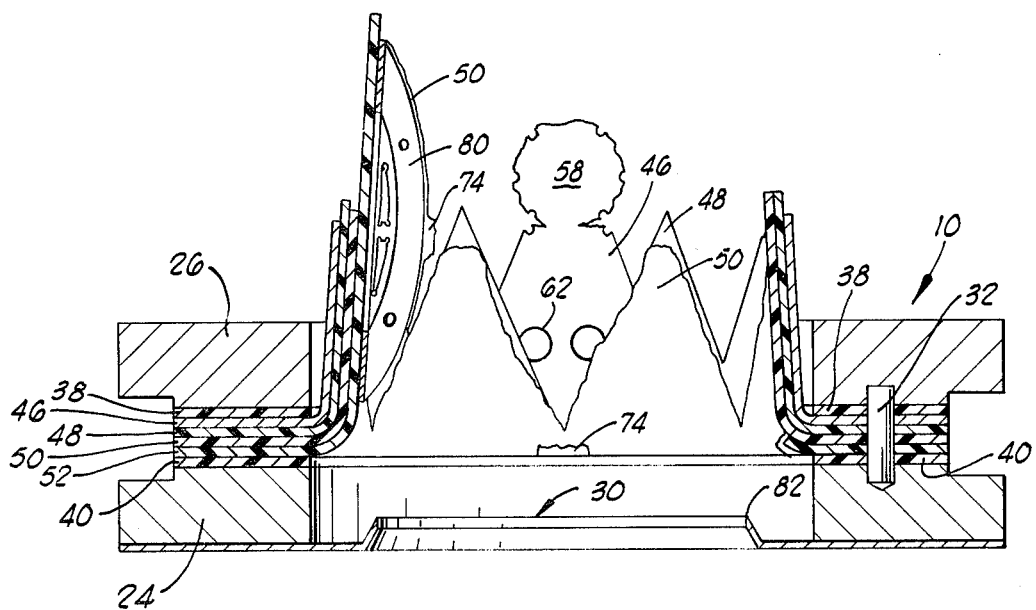
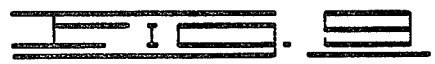

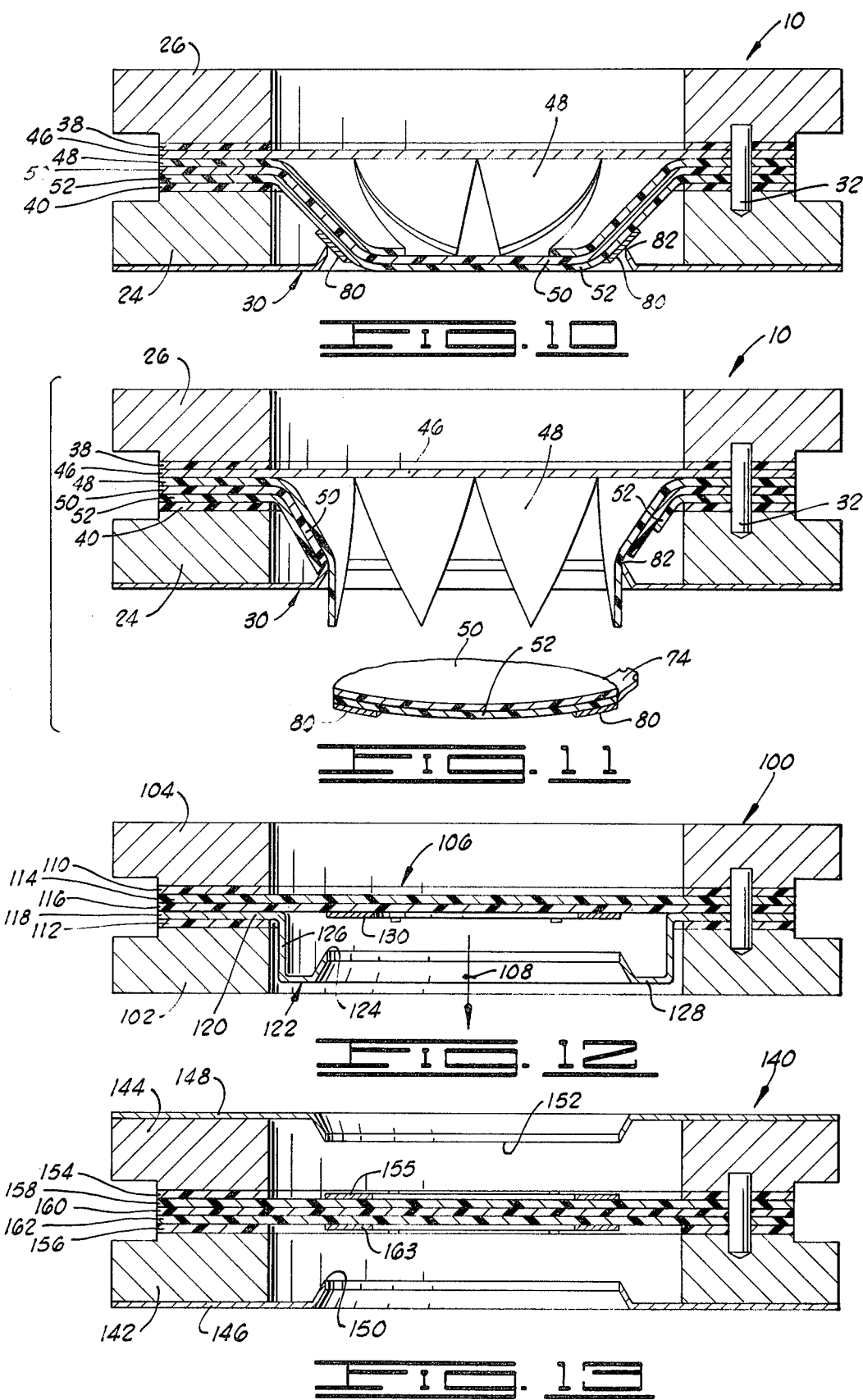

RUPTURABLE LOW PRESSURE RELIEF APPARATUS

BACKGROUND OF THE INVENTION

1. Field of the Invention

This invention relates generally to rupturable pressure relief apparatus, and more particularly, but not by way of limitation, to rupturable pressure relief apparatus which rupture at very low pressure differentials in both the normal and reverse rupture modes.

2. Description of the Prior Art

A variety of rupturable pressure relief apparatus have been developed and used heretofore. Generally, these devices include a rupture disk supported between a pair of complementary support members or flanges which are in turn connected to a relief connection in a vessel or system containing fluid pressure. When the fluid pressure within the vessel or system exceeds the design pressure of the rupture disk, rupture occurs allowing fluid pressure to be relieved from the vessel or system.

Most of the rupturable pressure relief apparatus of the prior art is designed for failure in one direction. That is, the apparatus is installed in a pressurized system between first and second pressure zones, so that when excess pressure occurs in the first zone, it is vented to the second zone. This is referred to as the "normal rupture mode".

In some applications of rupturable pressure relief apparatus it is not only necessary that the apparatus relieve fluid pressure in the normal rupture mode, i.e., from the first zone to the second zone, but also that the apparatus relieve fluid pressure in the reverse direction, i.e., from the second zone to the first zone. This is referred to as the "reverse rupture mode". An example of an application where the rupturable pressure relief apparatus must relieve fluid pressure in both directions is where the apparatus is installed on a vessel containing heated fluid under pressure. If the fluid pressure within the vessel becomes too high, the pressure relief apparatus must rupture in the normal rupture mode. On the other hand, if a vacuum is created within the vessel, such as by the rapid cooling of the fluid therein or the rapid withdrawal of fluid therefrom, the apparatus must relieve fluid pressure in the reverse rupture mode to protect the vessel from excess internal vacuum and the consequent damage thereto such as the collapse of the vessel. Many other applications requiring rupturable pressure relief apparatus having the ability to relieve excess pressure in both directions exist.

While rupturable pressure relief apparatus have been developed and utilized heretofore which relieve excess pressure in both the normal and reverse rupture modes, such devices are generally limited to applications where relatively high pressure differentials are exerted on the apparatus before rupture occurs. For example, U.S. Pat. No. 3,091,359 to Wood discloses such a device. The minimum rupture pressures which can predictably be achieved by the device of U.S. Pat. No. 3,091,359 are relatively high, and experience has shown that the '359 apparatus will provide a total rupture of both of its rupture disks in the reverse rupture mode only if the design rupture pressure in the normal rupture mode is not greater than twice the design rupture pressure in the reverse rupture mode.

U.S. Pat. No. 4,301,938 to Wood et al. is directed to a similar safety pressure relief device which can relieve fluid pressure in either direction at relatively low pressure differentials. However, the device of the '938 patent is still not suitable for use in applications where very low pressure differentials are involved, and as is the case in all such prior art apparatus wherein metal and plastic parts are utilized, problems occur which are brought about by the premature cutting of the plastic parts by sharp edges on the metal parts. Metal parts which include apertures, slits, slots and other configured openings formed therein very often also include sharp raised portions or burrs brought about by the manufacturing operation. When such metal parts are positioned adjacent plastic parts in a rupturable pressure relief apparatus, the fluid pressure exerted on the parts during operation of the apparatus cause the sharp edges or burrs to puncture or weaken the plastic parts and the consequent premature failure of the apparatus.

By the present invention improved rupturable pressure relief apparatus are provided which obviate problems associated with the cutting or weakening of plastic parts by the sharp edges of metal parts and which are particularly suitable for applications where rupture and pressure relief must occur at very low pressure differentials in both the normal and reverse rupture modes.

SUMMARY OF THE INVENTION

A rupturable pressure relief apparatus which ruptures at a low pressure differential adapted to be sealingly clamped between inlet and outlet annular support members is provided. The apparatus is basically comprised of a first circular rupturable member formed of a solid flexible material adapted to be positioned adjacent the inlet annular support member. A second circular rupturable member also formed of flexible material is positioned adjacent the first rupturable member on the opposite side thereof from the inlet support member. The second rupturable member is of a size corresponding with the first rupturable member and includes a solid annular flange portion and a plurality of arcuate slots circumscribing a substantially circular central portion with rupture tabs between the arcuate slots. Knife means having a cutting edge forming at least a portion of a circle are positioned adjacent the second rupturable member on the side thereof opposite the first rupturable member whereby upon rupture of the second rupturable member, the first rupturable member is cut by the cutting edge of the knife means. Apparatus which rupture in either direction when low pressure differentials are exerted thereacross are also provided.

It is, therefore, a general object of the present invention to provide rupturable low pressure relief apparatus.

A further object of the present invention is the provision of rupturable pressure relief apparatus which are suitable for very low pressure applications wherein all or a major portion of the parts of the apparatus are formed of flexible plastic material thereby eliminating or substantially reducing damage to plastic parts by sharp edges on metal parts.

Yet a further object of the present invention is the provision of rupturable pressure relief apparatus capable of reliable operation in both the normal and reverse rupture modes at very low pressure differentials.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 8 is a cross-sectional view taken along line 8—8 of FIG. 1.

FIG. 9 is an enlarged cross-sectional view of the apparatus of FIG. 1 after failure in the normal rupture mode.

FIG. 10 is an enlarged sectional view of the apparatus of FIG. 1 with fluid pressure exerted in the reverse rupture direction whereby the second and third rupture members are flexed into contact with the knife means of the apparatus.

FIG. 11 is a sectional view of the apparatus of FIG. 1 after rupture in the reverse rupture mode.

FIG. 12 is an enlarged sectional view of an alternate embodiment of the apparatus of the present invention.

FIG. 13 is an enlarged sectional view of yet another alternate embodiment of the apparatus of the present invention.

DESCRIPTION OF THE PREFERRED EMBODIMENTS

Figure 1:
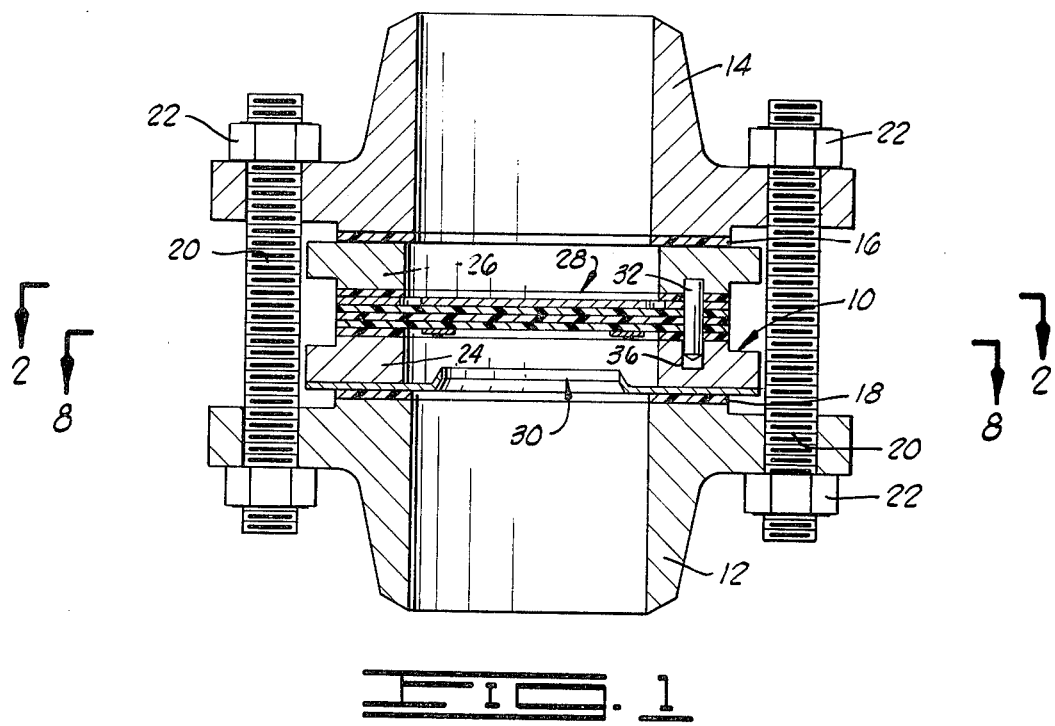
FIG. 1 is a side elevational view taken in cross section of one form of the apparatus of the present invention clamped between conventional pipe flanges.
Figure 2:
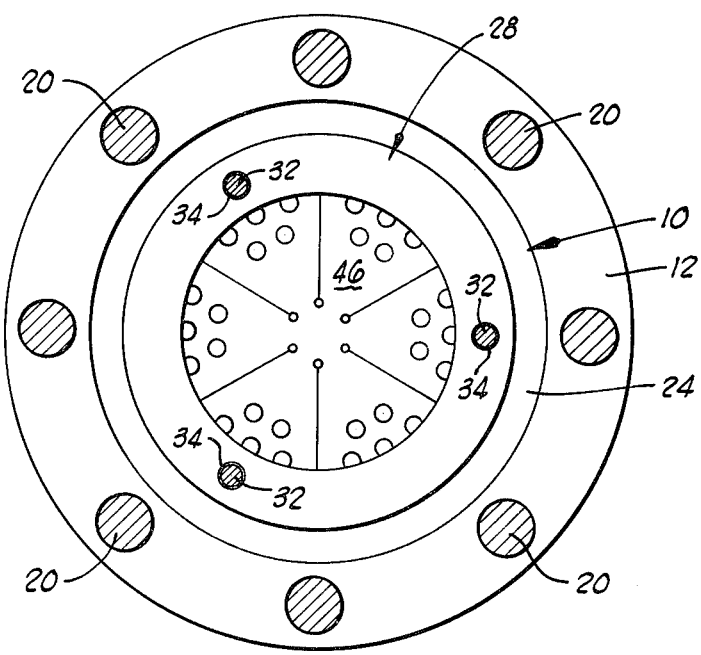
FIG. 2 is a view taken along line 2—2 of FIG. 1.
Figure 3:
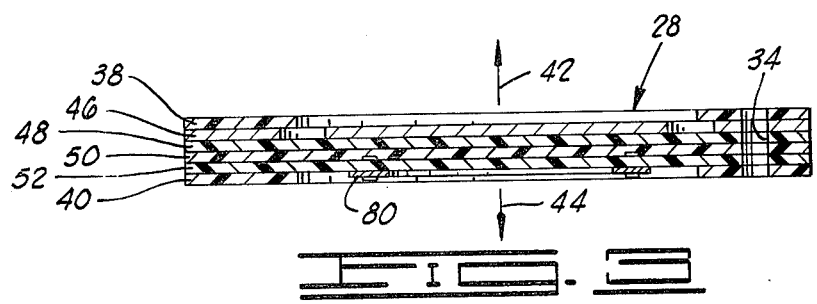
FIG. 3 is an enlarged cross-sectional view of a portion of the apparatus of FIG. 1.

Referring now to the drawings, and particularly to FIGS. 1-11, one embodiment of the apparatus of the present invention is illustrated and generally designated by the numeral 10. The apparatus 10 is the embodiment of the present invention most commonly utilized in that it is capable of relieving fluid pressure in both the normal and reverse rupture modes and ruptures in the normal rupture mode at a higher pressure differential than in the reverse rupture mode. In FIGS. 1, 2 and 8, the apparatus 10 is illustrated clamped between a pair of conventional pipe flanges 12 and 14 with conventional gaskets 16 and 18 inserted between the seating surfaces of the flanges and the apparatus 10 for facilitating the sealing engagement therewith. As is well understood by those skilled in the art, the pipe flanges 12 and 14 are clamped together by a plurality of studs 20 and nuts 22, and are installed in a conventional manner between first and second pressure zones.

The apparatus 10 is comprised of a pair of annular support members 24 and 26 between which a composite rupturable member, protection member and gasket assembly 28 are clamped. In the embodiment illustrated in FIGS. 1-11, knife means, generally designated by the numeral 30, are attached to the support member 24. However, as will be described further hereinbelow, the knife means 30 can be a part of the assembly 28 clamped between the support members 24 and 26.

The support member 26 includes three alignment pins 32 attached thereto and the assembly 28 and support member 24 include corresponding apertures 34 and recesses 36, respectively, for receiving the pins 32 when the support members 24 and 26 are clamped together with the assembly 28 therebetween. As is also well understood, the function of the pins 32, apertures 34 and recesses 36 is to maintain the assembly 28 in alignment with the support members 24 and 26 and to maintain the parts of the assembly 28 in proper orientation.

Referring now to FIGS. 3-7, the assembly 28 of the apparatus 10 is illustrated in detail. The assembly 28 includes a pair of annular gaskets 38 and 40 for facilitating a seal between the assembly 28 and the support members 24 and 26. Positioned between the gaskets 38 and 40 are three circular rupturable members and a circular protection member which are designed such that the composite assembly will rupture and relieve fluid pressure in the normal rupture mode (indicated by the arrow 42 of FIG. 3) at a low pressure differential and in the reverse rupture mode (indicated by the arrow 44) at a lower pressure differential. That is, positioned adjacent the annular gasket 38 is a first circular rupturable member 46 formed of metal. Positioned adjacent the first rupturable member 46 on the side thereof opposite the gasket 38 is a circular protection member 48 formed of a flexible material. Positioned adjacent the protection member 48 on the side thereof opposite the first rupturable member 46 is a second circular rupturable member 50 formed of flexible material and positioned adjacent the second rupturable member 50 is a third rupturable member 52 formed of flexible material. The term "flexible material" is used herein to mean various plastic materials which are flexible, which deform to some extent when fluid pressure is exerted thereon and which are relatively soft whereby sharp cutting edges are not formed on the materials.

Figure 4:
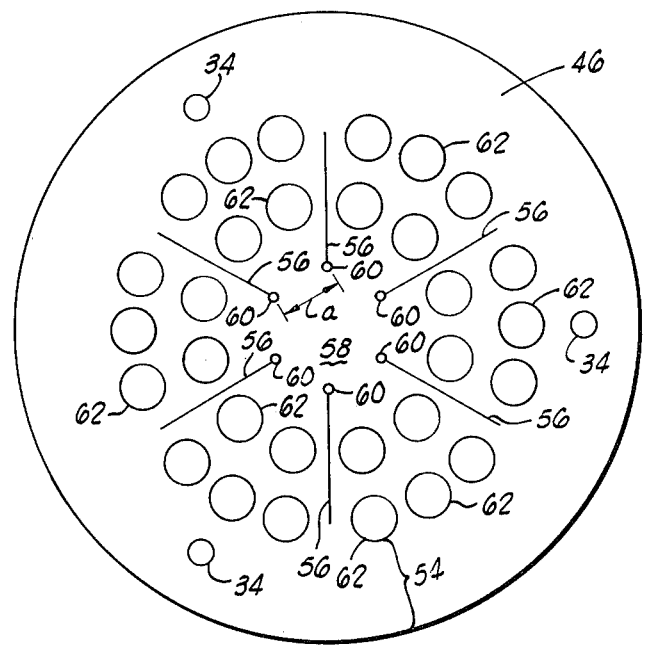
FIG. 4 is a top plan view of the first rupturable member of the apparatus of FIG. 3.

Referring now to FIG. 4, the first circular rupturable member 46 is illustrated. As mentioned above, in this embodiment the first rupturable member is preferably formed of metal and includes a solid annular flange portion 54 (except for the small apertures 34 at the periphery thereof). A plurality of radial slits 56 are provided in the member 46 extending from the solid annular flange portion 54 to a solid central portion 58. The slits 56 are preferably equally spaced whereby the member 46 is divided into partial sectors. Each of the slits 56 terminates at the inner end thereof in a small aperture 60. Positioned between each pair of slits 56 within the confines of the solid annular flange portion 54 and the solid central portion 58 of the member 46 are a plurality of circular openings 62. As will be further described hereinbelow, the circular openings 62 allow the communication of fluid pressure through the rupturable member 46, and the slits 56 cause the central portion of the member 46 to open in petals or sectors upon rupture of the member 46. The particular force required to be exerted on the rupturable member 46 to cause the rupture thereof depends on the spacing between the apertures 60 at the inner ends of the slits 56. That is, the distance a between pairs of apertures 60 when all of the apertures 60 are equally spaced apart determines the particular force or fluid pressure required for rupture of the member 46. The smaller the distance a between the apertures 60, the lower the fluid pressure required and the greater the distance a between the apertures 60, the greater the fluid pressure required. While the particular form of the first rupturable member 46 shown in FIG. 4 and described above is presently preferred, the first rupturable member 46 can take other forms, e.g., the openings 62 can be other than of circular configuration and less individual openings can be used.

Figure 5:
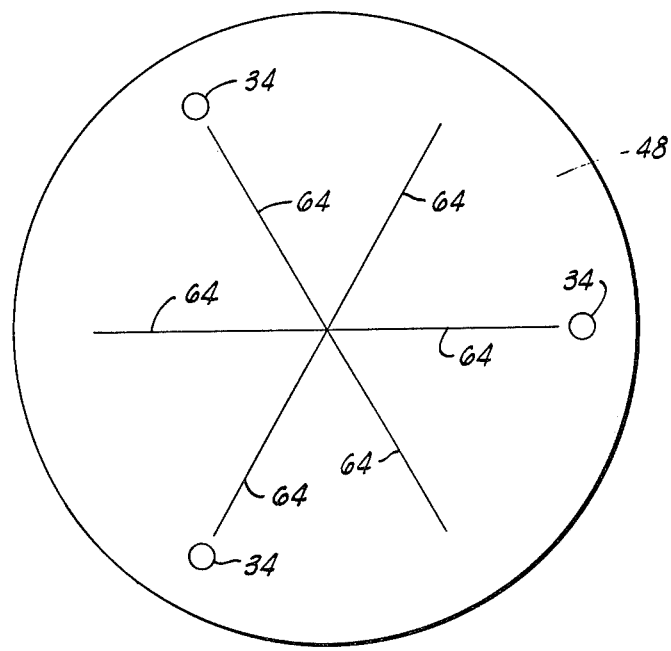
FIG. 5 is a top plan view of the protection member positioned immediately below the top rupturable member of FIG. 3.

Referring now to FIG. 5, the protection member 48 positioned adjacent the first rupturable member 46 is illustrated. The protection member 48 is formed of flexible material and can take various forms. Preferably, the protection member 48 is circular and is of a size corresponding with the first rupturable member 46. A plurality of slits 64 which intersect at the center of the member 48 are formed in the member 48 so that the central portion of the member 48 is divided into sectors. Because of the slits 64, fluid pressure freely passes through the protection member 48 in the assembly 28. The protection member 48 is orientated with respect to the first rupturable member 46 whereby the slits 64 are offset from the slits 56 and all of the edges formed by the slits 56 and openings 62 in the member 46 are covered by solid portions of the protection member 48.

Figure 6:
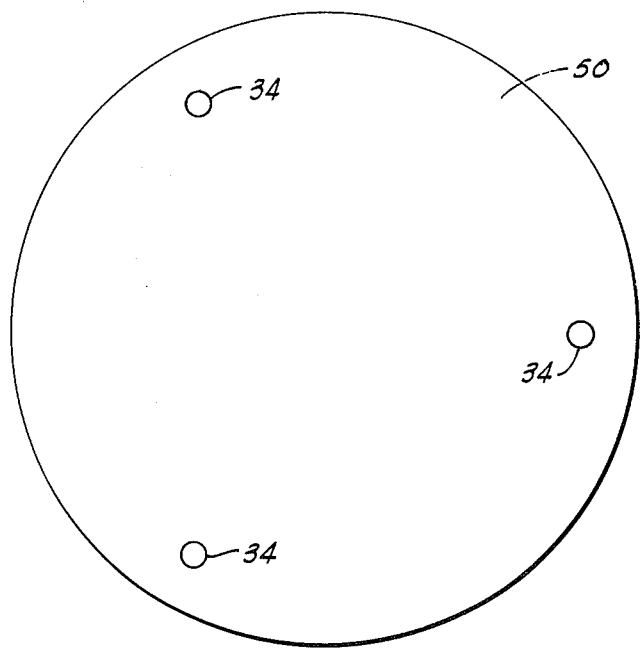
FIG. 6 is a top plan view of the second rupturable member positioned immediately below the protection member of FIG. 3.

Referring now to FIG. 6, the second circular rupturable member 50 is illustrated. The rupturable member 50 is of solid construction and is formed of flexible material.

Figure 7:
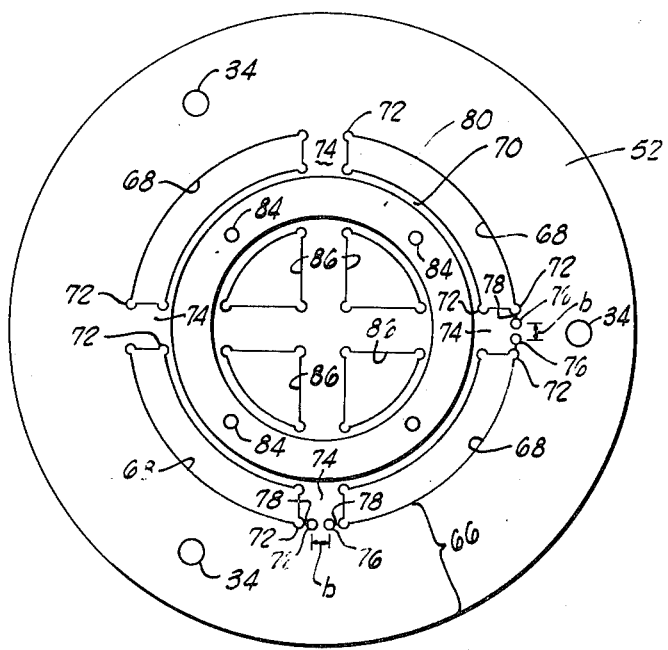
FIG. 7 is a bottom plan view of the third rupturable member positioned immediately below the second rupturable member of FIG. 3.

Referring now to FIG. 7, the third circular rupturable member 52 is illustrated. Like the protection member 48 and the second rupturable member 50, the third rupturable member 52 is formed of flexible material and is of a size corresponding with the members 48 and 50. The member 52 includes a solid (except for the small apertures 34) annular flange portion 66 and a plurality of arcuate slots 68 positioned adjacent the flange portion 66 and circumscribing a substantially circular central portion 70. For ease of construction, the corners of each of the slots 68 are formed by apertures 72 and the adjacent ends of the slots 68 form rupture tabs 74 in the member 52. That is, the rupture tabs 74 are the solid portions of the rupturable member 52 between the ends of adjacent slots 68. In order to make the rupture tabs 74 the weakest points in the rupturable member 52 and thereby cause the rupturable member to rupture at the location of the rupture tabs 74, a pair of spaced apart apertures 76 are disposed in two or more of the rupture tabs connected to adjacent ends of the slots 68 by slits 78. As will be understood, the distance between the apertures 76 designated by the letter b determines the particular force which must be applied to the rupturable member 52 by way of fluid pressure exerted on the rupturable member 50 to cause the rupturable member 52 to rupture at the rupture tabs 74.

A thin metal protection ring 80 having a size such that it overlaps the circular cutting edge 82 of the knife means 30 is attached to the central portion 70 of the rupturable member 52 by brads or rivits 84. In order to allow the free passage of fluids under pressure through the rupturable member 52, additional openings 86 are provided in the central portion 70 inside the thin metal protection ring 80.

As best shown in FIGS. 1 and 8, the knife means 30 of the apparatus 10 are comprised of a circular metal plate attached to the bottom side of the support member 24 and having a central enlarged circular opening therein the periphery of which includes an upstanding sharpened circular cutting edge 82.

OPERATION OF THE APPARATUS 10

Referring particularly to FIGS. 1 and 9–11, the pipe flanges 12 and 14 within which the apparatus 10 is clamped are connected to first and second pressure zones, respectively. For example, the pipe flange 12 may be connected by piping (not shown) to a pressure vessel or system and the flange 14 to the atmosphere. The apparatus 10 is designed to rupture in the normal rupture mode whereby fluids are relieved from the pipe flange 12 to the pipe flange 14 at a low pressure differential, e.g., 7–10 psig. The apparatus 10 is also designed to rupture in the reverse rupture mode whereby fluid under pressure such as atmospheric air is allowed to flow from the flange 14 through the apparatus 10 into the flange 12 at a lower pressure differential, e.g., 17–24 inches of water. Thus, if the fluid pressure within the vessel or system being protected by the apparatus 10 increases to a level in the range of from about 7–10 psig, the apparatus 10 ruptures and relieve pressurized fluids from the vessel or system. When the vessel or system being protected reaches an excess vacuum condition in the range of from 17–24 inches of water, the apparatus 10 ruptures in the reverse rupture mode.

When the apparatus 10 ruptures in the normal rupture mode, fluid pressure from the vessel or system being protected is communicated through the slots 68 and openings 86 in the third rupturable member 52 to the second rupturable member 50. The fluid pressure exerted on the rupturable member 50 forces the member 50 against the protection member 48 and the first rupturable member 46. When the fluid pressure exerted on the member 50 exceeds the design rupture pressure of the first rupturable member 46, the member 46 ruptures by tearing between the apertures 60 therein and opens in petal fashion with the central portion 58 remaining attached to one of the petals as shown in FIG. 9. Upon rupture of the member 46, the rupturable member 50 ruptures and opens which also opens the protection member 48. The force of pressurized fluids flowing through the third rupturable member 52 usually causes the rupturable member 52 to tear at three of the rupture tabs 74 thereof and fold upwardly as shown in FIG. 9 whereby the apparatus 10 is fully open and pressurized fluids are relieved in the normal rupture mode.

When a pressure differential is exerted on the apparatus 10 in the reverse direction, fluid pressure is communicated by way of the openings 62 in the first rupturable member 46 and the slits 64 in the protection member 48 to the second rupturable member 50. Because both the second rupturable member 50 and the third rupturable member 52 are formed of flexible material, the fluid pressure exerted on the member 50 causes both the member 50 and the member 52 to deform in a direction towards the knife means 30 and the circular cutting edge 82 thereof as shown in FIG. 10. However, because of the thin metal protection ring 80 attached to the third rupturable member 52, when the second and third rupturable members 50 and 52 deform but do not rupture, the cutting edge 82 of the knife means 30 is prevented from cutting the third rupturable member 52 by the protection ring 80. That is, the protection ring 80 contacts the cutting edge 82 and thereby prevents the third rupturable member 52 from contacting the cutting edge.

When the pressure differential exerted across the apparatus 10 reaches the predetermined rupture pressure thereof in the reverse rupture mode, the rupture tabs 74 of the third rupturable member 52 tear between the apertures 76 therein which causes the central portion of the third rupturable member 52 and the protection ring 80 to pass through the circular opening in the knife means 30. The central portion of the second rupturable member 50 is severed by the cutting edge 82 of the knife means 30 whereby the central portion of the second rupturable member 50 and the central portion of the third rupturable member 52 pass through the knife means and the apparatus 10 is fully opened as shown in FIG. 11.

If it is desirable that upon rupture in the reverse rupture mode the central portions of the rupturable members 50 and 52 remain attached to the apparatus 10, the knife means 30 can include a gap 90 (shown in dashed line on FIG. 8) whereby the cutting edge 82 of the knife means 30 defines a partial circle and the central portions of the rupturable members 50 and 52 remain attached to the peripheral portions thereof at one side of the apparatus 10.

Because the apparatus 10 has only one metal rupturable member and any sharp edges or burrs thereon are prevented from cutting or damaging the rupturable member 50 by the protection member 48, problems associated with such damage are prevented in the apparatus 10. As mentioned above and as will be understood, the pressure differential at which the apparatus 10 ruptures in the normal rupture mode is controlled by the distance a (FIG. 4) between the apertures 60 in the first rupturable member 46 and the pressure at which the apparatus 10 ruptures in the reverse rupture mode is controlled by the distance b (FIG. 7) between the apertures 76 in two or more of the rupture tabs 74 thereof.

Referring now to FIG. 12, an alternate embodiment of the apparatus of the present invention is illustrated and generally designated by the numeral 100. The apparatus 100 includes a pair of annular support members 102 and 104 between which a composite rupturable member, knife means and gasket assembly, generally designated by the numeral 106, is clamped. The apparatus 100 is an embodiment of the present invention for use in applications where rupture of the apparatus and fluid pressure relief is required in one direction only at a low pressure differential. That is, the apparatus 100 is designed to relieve fluid pressure in the normal rupture mode only as indicated by the arrow 108.

The composite assembly 106 is comprised of a pair of annular gaskets 110 and 112 between which rupturable members and knife means are clamped. That is, a first rupturable member 114 is positioned adjacent the gasket 110 which is formed of a solid flexible material and which is identical to the rupturable member 50 illustrated in FIG. 6. Positioned adjacent the first rupturable member 114 on the side thereof opposite the gasket 110 is a second rupturable member 116 also formed of flexible material which is identical in all respects to the rupturable member 52 illustrated in FIG. 7. Positioned between the second rupturable member 114 and the gasket 112 is the annular flange portion 120 of a circular knife means generally designated by the numeral 122. That is, the knife means 122 includes an annular flange portion 120 of a size such that it can be clamped between the rupturable member 118 and the gasket 112. The annular flange portion 120 of the knife means 122 is connected to a recessed circular or partially circular cutting edge 124 by an annular L-shaped portion of the knife means 122.

The operation of the apparatus 100 is identical to the reverse mode operation of the apparatus 10 as described above. That is, when a pressure differential is exerted across the assembly 106 which is equal to or exceeds the predetermined rupture pressure of the apparatus 100, the first and second rupturable members 114 and 116 are flexed towards the cutting edge 124 of the knife means 122. If the rupturable member 116 does not rupture prior to the member 116 being flexed into contact with the cutting edge 124 of the knife means 122, the annular metal protection ring 130 attached thereto prevents the member 116 from being severed. When the rupturable member 116 ruptures by the tearing of the rupture tabs thereof, the central portion passes through the circular opening of the cutting edge 124 and the rupturable member 114 is severed by the cutting edge 124 causing the apparatus 10 to open fully.

Referring now to FIG. 13, yet another alternate embodiment of the apparatus of the present invention is illustrated and generally designated by the numeral 140. The apparatus 140 is similar to the apparatus 10 except that a rupturable member 158 identical to the rupturable member 52 shown in FIG. 7 is substituted for the first rupturable member 46 and the protection member 48 of the apparatus 10. In addition, an additional knife means is provided positioned adjacent the rupturable member 158. More specifically, the apparatus 140 is comprised of a pair of annular support members 142 and 144 each having a knife means 146 and 148, respectively, attached thereto which include circular or partially circular cutting edges 150 and 152, respectively. Clamped between the support members 142 and 144 are a pair of annular gaskets 154 and 156. Positioned adjacent the gasket 154 is a first rupturable member 158 formed of flexible material identical to the first rupturable member 52 of the apparatus 10 illustrated in FIG. 7 including a thin metal protection ring 155 attached thereto. Positioned adjacent the rupturable member 158 is a second rupturable member 160 formed of flexible material identical to the rupturable member 50 of the apparatus 10. Positioned adjacent the rupturable member 160 is a third rupturable member 162 formed of flexible material which is also identical to the rupturable member 52 of the apparatus 10 and which includes a metal protection ring 163 attached thereto.

As shown in FIG. 13, the first rupturable member 158 is positioned opposite the third rupturable member 162 whereby when the composite assembly flexes into contact with the knife means 148, the protection ring 155 prevents the rupturable member 158 from being cut and when the composite assembly flexes in the other direction into contact with the cutting edge 150 of the knife means 146, the protection ring 163 prevents the cutting of the third rupturable member 162.

The operation of the apparatus 140 is identical to the operation of the apparatus 100 described above except that the apparatus 140 will rupture in both the normal rupture mode and reverse rupture mode at predetermined pressure differentials. The apparatus 140 is particularly suitable in applications where the predetermined pressure differentials for causing rupture in the normal and reverse rupture modes are very low and are substantially the same. This is contrasted with the apparatus 10 wherein the pressure differential for causing rupture in the normal rupture mode is higher than the pressure differential for causing rupture in the reverse rupture mode thereby dictating the use of the first rupturable member 46 formed of metal and the protection member 48.

The apparatus 100 and the apparatus 140 are particularly advantageous in that they do not include metal parts positioned whereby damage to plastic parts can take place. In addition, all of the various embodiments of the apparatus of the present invention are generally operable at lower pressure differentials than prior art apparatus.

As will be understood, knife means of the type illustrated in FIG. 12 can be utilized in the apparatus 10 and in the apparatus 140, and if desired for all of the embodiments of the present invention, the rupturable assemblies including gaskets, rupturable members, knife means, etc., can be attached together to provide a unitary product which can be utilized without special support members being required. That is, the apparatus can be clamped directly between conventional pipe flanges or other support members.

Thus, the present invention is well adapted to carry out the objects and attain the ends and advantages mentioned as well as those inherent therein. While presently preferred embodiments of the invention have been described for purposes of this disclosure, numerous changes can be made in the construction and arrangement of parts, which changes are encompassed within the spirit of this invention as defined by the appended claims.

What is claimed is:

1. A rupturable pressure relief apparatus which ruptures at a low pressure differential adapted to be sealingly clamped between inlet and outlet annular support members comprising:
    a first circular rupturable member formed of solid flexible material adapted to be positioned adjacent said inlet annular support member;
    a second circular rupturable member formed of flexible material positioned adjacent said first rupturable member on the opposite side thereof from said inlet support member, said second rupturable member being of a size corresponding with said first rupturable member and including a solid annular flange portion and a plurality of arcuate slots circumscribing a substantially circular central portion with rupture tabs between said arcuate slots;
    knife means having a cutting edge forming at least a portion of a circle positioned adjacent said second rupturable member on the side thereof opposite from said first rupturable member; and
    an annular metal protection ring attached to the side of said second rupturable member facing said knife means, said protection ring being of a size such that when said second rupturable member flexes into contact with said cutting edge of said knife means, said protection ring prevents said second rupturable member from being cut by said cutting edge but when said second rupturable member ruptures, said protection ring passes through said knife means.

2. The apparatus of claim 1 wherein said second rupturable member is further characterized to include a plurality of openings formed in said central portion thereof.

3. The apparatus of claim 2 which is further characterized to include gasket means between said rupturable pressure relief apparatus and said inlet and outlet support members.

4. A rupturable pressure relief apparatus which ruptures in either direction when a low pressure differential is exerted thereacross adapted to be sealingly clamped between inlet and outlet annular support members comprising:
    a first circular rupturable member formed of flexible material including a solid annular flange portion and a plurality of arcuate slots circumscribing a substantially circular central portion with rupture tabs between said arcuate slots;
    a second circular rupturable member formed of solid flexible material of a size corresponding with said first rupturable member positioned adjacent said first rupturable member;
    a third circular rupturable member positioned adjacent said second rupturable member on the opposite side thereof from said first rupturable member of a size corresponding with said first and second rupturable members, said third rupturable member being formed of flexible material and including a solid annular flange portion and a plurality of arcuate slots circumscribing a substantially circular central portion with rupture tabs between said arcuate slots;
    a first knife means having a cutting edge forming at least a portion of a circle positioned adjacent said first rupturable member on the side thereof opposite from the second rupturable member;
    a second knife means having a cutting edge forming at least a portion of a circle positioned adjacent said third rupturable member on the side thereof opposite from said second rupturable member whereby upon the rupture of either of the first or third rupturable members, the second rupturable member is cut by the cutting edge of the first or second knife means, respectively; and
    each of said first and third rupturable members including an annular metal protection ring attached to the side thereof facing said first or second knife means, said protection rings being sized such that when said first or third rupturable members flex into contact with the cutting edges of said first or second knife means, respectively, said protection rings prevent said rupturable members from being cut by said cutting edges but when said rupturable members rupture, said protection rings pass through said knife means.

5. The apparatus of claim 4 wherein each of said first and third rupturable members are further characterized to include a plurality of openings formed in said central portions thereof.

6. The apparatus of claim 5 which is further characterized to include gasket means positioned between said rupturable pressure relief apparatus and said inlet and outlet annular support members.

7. A rupturable pressure relief apparatus which ruptures in one direction when a low pressure differential is exerted thereacross and which ruptures in the opposite direction when an opposite lower pressure differential is exerted thereacross adapted to be sealingly clamped between a pair of annular support members comprising:
    a first circular rupturable member having a plurality of radial slits formed therein extending from a solid central portion thereof to a solid annular flange portion thereof and having a plurality of openings formed therein between said slits and between said solid central portion and said solid annular flange portion;
    a second circular rupturable member positioned adjacent one side of said first circular rupturable member, said second rupturable member being formed of a solid flexible material and being of a size corresponding with said first rupturable member;
    a third circular rupturable member positioned adjacent said second rupturable member on the opposite side thereof from said first rupturable member of a size corresponding with said first and second rupturable members, said third rupturable member being formed of flexible material and including a solid annular flange portion and a plurality of arcuate slots circumscribing a substantially circular central portion with rupture tabs between said arcuate slots;

knife means having a cutting edge forming at least a portion of a circle positioned adjacent said third rupturable member on the side thereof opposite from said second rupturable member; and an annular metal protection ring attached to the side of said third rupturable member facing said knife means, said protection ring being of a size such that when said third rupturable member flexes into contact with said cutting edge of said knife means, said protection ring prevents said third rupturable member from being cut by said cutting edge, but when said third rupturable member ruptures said protection ring passes through said knife means.

8. The apparatus of claim 7 wherein said third rupturable member is further characterized to include a plurality of openings formed in said central portion thereof.

9. The apparatus of claim 7 wherein said first rupturable member is formed of metal and said second and third rupturable members are formed of plastic material.

10. The apparatus of claim 9 which is further characterized to include a circular flexible protection member formed of plastic material positioned between and of a size corresponding with said first and second rupturable members to protect said second rupturable member from being cut by sharp edges on said first rupturable member.

11. The apparatus of claim 10 wherein said protection member includes an annular flange portion and a plurality of radially extending slits formed therein dividing the central portion thereof into sectors, said protection member being orientated with respect to said first rupturable member whereby the radial slits therein are offset from the radial slits and openings in said first rupturable member.

12. The apparatus of claim 11 which is further characterized to include a pair of annular gasket means positioned whereby the annular flange portions of said first rupturable member, said protection member and said second and third rupturable members are between said annular gasket means.

13. A rupturable pressure relief apparatus adapted to be clamped between the seating surfaces of a pair of conventional pipe flanges which ruptures in one direction when a low pressure differential is exerted thereacross and which ruptures in the opposite direction when an opposite lower pressure differential is exerted thereacross comprising:

a first annular support member having a seating surface for sealingly coating with the seating surface of one of said pipe flanges and having an oppositely facing annular seating surface;

a first circular rupturable member having a solid annular flange portion for sealingly coacting with the annular seating surface of said first annular support member, having a plurality of radial slits formed therein extending from a solid central portion thereof to the solid annular flange portion thereof and having a plurality of openings formed therein between said slits and between said solid central portion and said solid annular flange portion;

a second circular rupturable member positioned adjacent the side of said first rupturable member opposite from said first annular support member, said second rupturable member being formed of a solid flexible material and being of a size corresponding with said first rupturable member;

a third circular rupturable member positioned adjacent said second rupturable member on the opposite side thereof from said first rupturable member of a size corresponding with said first and second rupturable members, said third rupturable member being formed of flexible material and including a solid annular flange portion for sealingly coacting with the peripheral portion of said second rupturable member and the annular flange portion of said first rupturable member and having a plurality of arcuate slots circumscribing a substantially circular central portion with rupture tabs between said arcuate slots;

a second annular support member having an annular seating surface for sealingly coacting with the side of the annular flange portion of said third rupturable member opposite from said second rupturable member and having an oppositely facing seating surface for sealingly coacting with the seating surface of the other of said pipe flanges;

knife means positioned adjacent said third rupturable member supported by said second annular support member having a cutting edge forming at least a portion of a circle; and an annular metal protection ring attached to the side of said third rupturable member facing said knife means, said protection ring being of a size such that when said third rupturable member flexes into contact with said cutting edge of said knife means, said protection ring prevents said third rupturable member from being cut by said cutting edge, but when said third rupturable member ruptures said protection ring passes through said knife means.

14. The apparatus of claim 13 wherein said third rupturable member is further characterized to include a plurality of openings formed in said central portion thereof.

15. The apparatus of claim 13 wherein said first rupturable member is formed of metal and said second and third rupturable members are formed of plastic material.

16. The apparatus of claim 15 which is further characterized to include a circular flexible plastic protection member positioned between and of a size corresponding with said first and second rupturable members to protect said second rupturable member from being cut by sharp edges on said first rupturable member.

17. The apparatus of claim 16 wherein said protection member includes an annular flange portion and a plurality of radially extending slits formed therein dividing the central portion thereof into sectors, said protection member being orientated with respect to said first rupturable member whereby the radial slits therein are offset from the radial slits in said first rupturable member.

18. The apparatus of claim 17 which is further characterized to include annular gasket means positioned between the seating surfaces of said pipe flanges and said support members.

19. The apparatus of claim 18 which is further characterized to include an annular gasket means positioned between said first support member and the annular flange portion of said first rupturable member and an annular gasket means positioned between said second support member and the annular flange portion of said third rupturable member.

* * * * *